United States Patent [19]

Corby et al.

[11] Patent Number: 4,781,337

[45] Date of Patent: Nov. 1, 1988

[54] LIGHT-TIGHT FILM ROLL CONTAINER

[75] Inventors: Kenneth D. Corby; Robert R. Woodhams, both of Rochester, N.Y.

[73] Assignee: Eastman Kodak Company, Rochester, N.Y.

[21] Appl. No.: 948,187

[22] Filed: Dec. 31, 1986

[51] Int. Cl.⁴ .............................................. G03B 1/04
[52] U.S. Cl. ................................ 242/71.1; 352/78 R; 354/281
[58] Field of Search ............... 242/71.1, 197; 206/310, 206/312, 455; 352/78 R; 354/275, 281; 403/408.1

[56]  References Cited

U.S. PATENT DOCUMENTS

| | | | |
|---|---|---|---|
| 2,729,401 | 1/1956 | Italiano | 242/71.1 |
| 2,920,682 | 1/1960 | Lindberg | 220/4 B |
| 3,159,357 | 12/1964 | Berlings | 354/275 X |
| 3,195,720 | 7/1965 | Canniere | 242/71.1 |
| 3,421,682 | 1/1969 | Eisenbach | 229/2.5 R |
| 3,447,731 | 6/1969 | Lehman | 229/2.5 R |
| 3,563,482 | 2/1971 | Auld | 220/4 B |
| 3,904,284 | 9/1975 | Blank | 352/78 R |
| 4,466,585 | 8/1984 | Maehara | 220/4 B |
| 4,597,658 | 7/1986 | Buelens | 242/71.1 X |

FOREIGN PATENT DOCUMENTS 1580011 7/1969 France .
606147 7/1960 Italy ................................ 403/408

*Primary Examiner*—Stuart S. Levy
*Assistant Examiner*—Katherine Matecki
*Attorney, Agent, or Firm*—William C. Dixon

[57] ABSTRACT

A film roll container is disclosed of the type having mating receptacle and cover portions. The portions have facing laterally extending central spindles for rotatably supporting opposite ends of a film roll when the cover portion is mounted on the receptacle portion. The portions further have securing means comprising a plurality of spaced-apart first and second mating frusto-conical bosses. The first boss has a flat end portion having an annular recess such that the end portion in cross section is W-shaped. The second boss has an axial V-shaped cavity in the end thereof such that the second boss defines a projection of W-shaped cross section which is nestable in light-tight relation within the annular recess.

3 Claims, 3 Drawing Sheets

LIGHT-TIGHT FILM ROLL CONTAINER

BACKGROUND OF THE INVENTION

Field of the Invention

This invention relates generally to film roll containers, and more specifically to a light weight, light-tight thermoformed film roll container.

Description of the Prior Art

It is know in the prior art to provide reusable film roll containers comprising receptacle and cover portions formed from cast aluminum. Such film roll containers present problems. One problem is that such containers are heavy and difficult to handle by the customer who has to load them. Another problem is that such containers generate dirt because of their reuse which deleteriously affects the performance of the film.

A disposable film container is further known in the art of the type having a thermoformed bottom portion comprising a bottom wall and a peripheral upstanding wall, and a mating thermoformed cover portion having a top wall and a peripheral depending wall overlapping the upstanding wall. The receptacle and cover portions have laterally extending central spindles for rotatably supporting opposite ends of a film roll when the cover portion is mounted on the receptacle portion to close the container. The closed container has a light-tight opening on one wall defined by the receptacle and cover portions through which a leader on the film roll extends. The closed non-light-tight container is made light-tight by inserting it into a form-fitting cardboard box having a slit in the end thereof through which the leader and film are pulled out of the container. The loading of the container and insertion thereof into the cardboard box are performed in the dark and achieve, upon completion, a light-tight box and container which is insertable in daylight into a camera or the like. One of the problems with this cardboard box enclosed film container is that the cardboard box provides a source of dirt which may contaminate the film. Another problem is that the carbodard box is needed to make the cartridge light-tight, and this results in a more labor intensive, complicated and costly film roll container.

There is a need, therefor, for a light-tight film roll container that is of simple design and construction, thoroughly reliable and efficient in operation, and economical to manufacture.

SUMMARY OF THE INVENTION

An object of the present invention is to provide a film roll container of the type having a receptacle portion having a bottom wall and a peripheral upstanding wall, and a mating cover portion having a top wall and a peripheral depending wall overlapping the upstanding wall, the receptacle and cover portions having laterally extending central spindles for rotatably supporting opposite ends of a film roll when the cover portion is mounted on the receptacle portion, the combination comprising;

a plurality of spaced first bosses projecting upwardly from the bottom wall in the space between one of the upstanding and dependent walls and the outer periphery of the film roll, each first boss having an end portion having an annular recess therein whereby the end portion in cross section is W-shaped;

a plurality of spaced second bosses depending downwardly from the top wall in the space between the other of the upstanding and dependent walls and the outer periphery of the film roll, each second boss being positioned in register with one of the first bosses and having an end surface having a V-shaped cavity whereby the second boss defines a projection of W-shaped cross section which is nestable in light-tight relation within the annular recess of the first boss.

In a more specific object of the invention, openings extend through the centers of each mating pair of projections and annular recesses, and securing means are guided through the openings by a V-shaped bore in the end portion of the first boss opposite the annular recess for securing the first and second bosses and receptacle and cover portions together.

BRIEF DESCRIPTION OF THE DRAWINGS

In the detailed description of the invention presented below, reference is made to the accompanying drawings, in which.

DETAILED DESCRIPTION OF THE INVENTION

Figure 1:
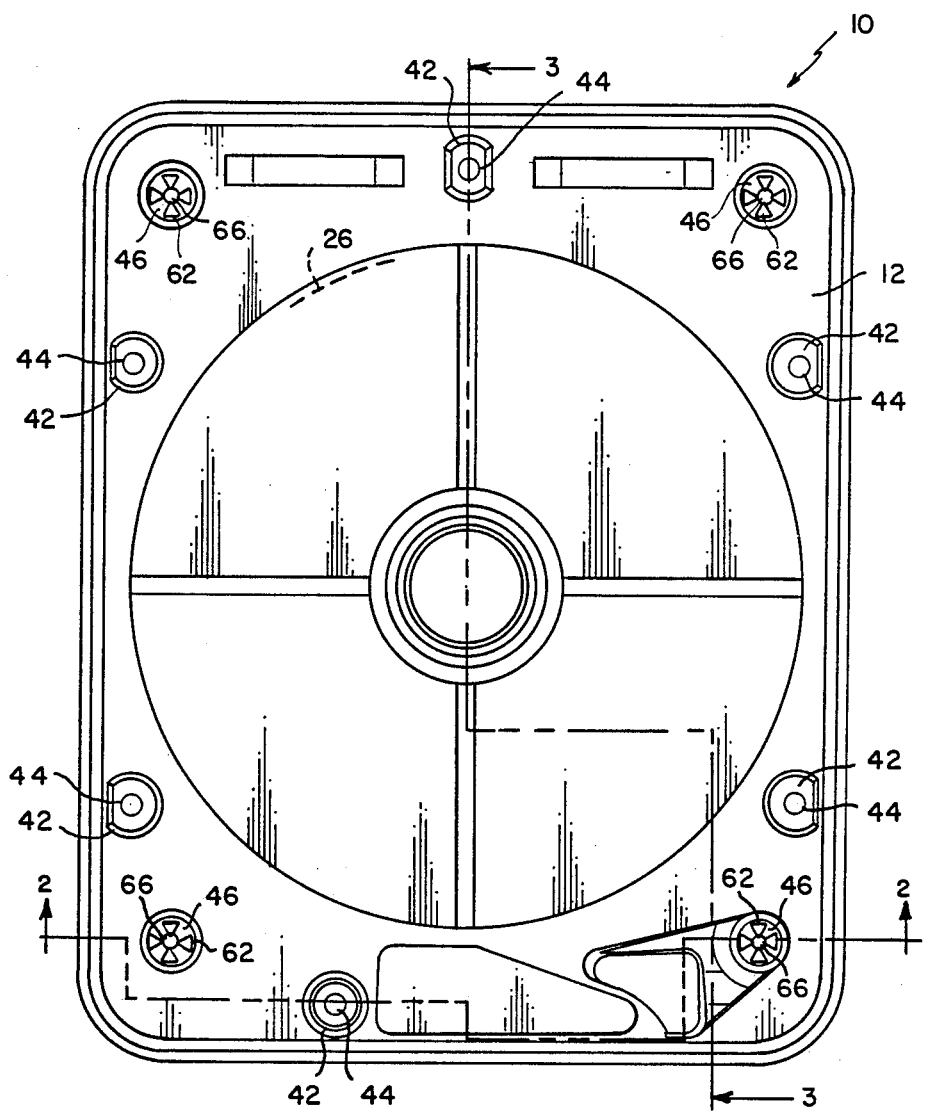
FIG. 1 is a top plan view of a preferred embodiment of the light-tight film roll container of the present invention.
Figure 2:
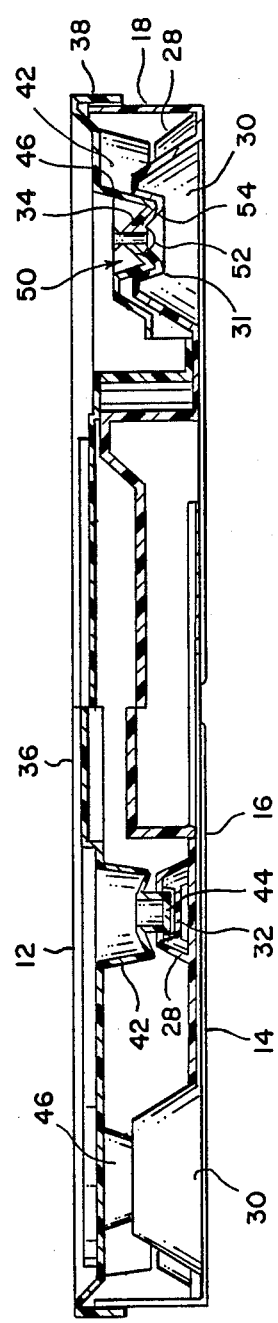
FIG. 2 is a section view taken substantially along line 2—2 of FIG. 1.
Figure 4:
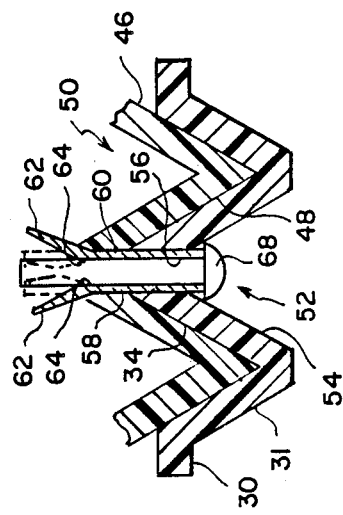
FIG. 4 is an enlarged segmental section view of a portion of the film roll container of FIG. 2.
Figure 3:
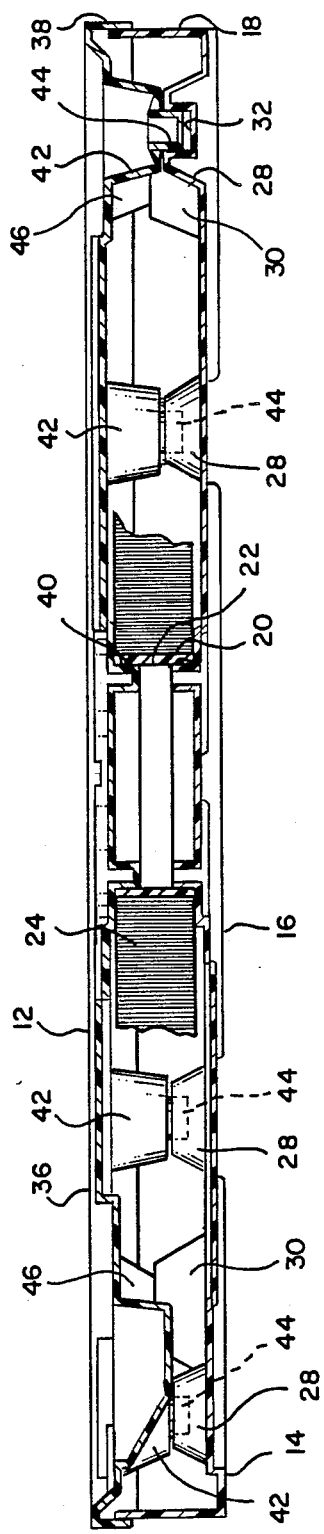
FIG. 3 is a section view taken substantially along line 3—3 of FIG. 1, with portions of the film roll removed.

Referring now to FIGS. 1-4 of the drawings, a preferred embodiment of the light-tight film roll container 10 of this invention is disclosed. The film roll container 10 comprises rectangularly shaped cover and receptacle mating portions 12, 14 respectively preferably formed by a thermoforming process. The receptacle portion 14 comprises a bottom wall 16 having a peripheral upstanding wall 18. The bottom wall 16 has a central upstanding spindle 20 (FIG. 3) for rotatably supporting one end of a core 22 supporting a film roll 24. The portion of the bottom wall extending between the outer periphery 26 of film roll 24 and upstanding wall 18 is provided with a plurality of angularly spaced protuberances 28 and a plurality of angularly spaced first bosses 30 (FIG. 2). The upper end surfaces of the protuberances 28 are provided with blind bores 32. The upper end portion 31 of each of the first bosses 30 is provided with an annular recess 34 whereby the end portion in cross section is W-shaped, as best seen in FIGS. 2 and 4.

The cover portion 12 is also rectangular, and comprises a top wall 36 and a peripheral depending wall 38 overlapping upstanding wall 18 when the cover portion is mounted on the receptacle portion. The top wall 36 has a depending central spindle 40 insertable into the opposite end of core 22 of film roll 24 when cover portion 12 is mounted on receptacle portion 14. The top wall 36 is provided in the space between the outer periphery of the film roll 24 and the depending wall with angularly spaced depending protuberances 42 in register with the lower protuberances 28. Each depending protuberance 42 is provided with a post 44 surrounded by a shoulder, and each post is insertable into the corresponding blind bore 32 in register therewith when the cover portion 12 is mounted on the receptacle portion 14 for aligning and releasably holding the cover and receptacle portions together. The top wall 36 is further provided with second bosses 46 depending from the portion of the top wall 12 extending between the outer periphery of film roll 24 and depending wall 38. Each angularly spaced apart second boss 46 is provided with an axial V-shaped cavity 48 on its end surface whereby the second boss forms a projection 50 of W-shaped cross section, as best seen in FIGS. 2 and 4. When cover portion 12 is mounted on receptacle portion 14, each projection 50 nests within corresponding annular recess 34. A plane taken through the centers of mating annular recess 34 and projection 50 defines mating surfaces of W-shaped cross section, as best seen in FIG. 4. The W-shaped surfaces in mating engagement form a light-lock to prevent light from entering the film roll container 10.

The cover and receptacle portions 12, 14 respectively are secured together in light-tight relation by any suitable securing means, such as, for example, a rivet 52 of known type. Each rivet is guided, during assembly of the container in the dark, by a V-shaped bore 54 formed in the side of end portion 31 opposite annular recess 34. The bores guide the rivets 52 through openings 56, 58 in the centers of the bores 54 and V-shaped cavities 48 respectively, as best seen in FIG. 4. Although rivet 52 may be of any known type, a rivet that works satisfactorily is one having a plastic cylindrical sleeve 60 having a plurality of angularly arranged projection fingers 62 with inner cam followers 64 adjacent the ends thereof. The rivet 50 further has a post 66 slidable within sleeve 60, the post having a head 68 at one end and the opposite end forming a cam adapted to engage the cam followers 64 upon inward movement of the post 66 for camming the fingers 62 outwardly. The cover 12 and receptable 14 portions are secured together in light-tight relation between the outwardly flared fingers 62 and heads 68 of the fully inserted rivets 52.

The invention has been described in detail with particular reference to a preferred embodiment thereof, but it will be understood that variations and modifications can be effected within the spirit and scope of the invention.

What is claimed is:

1. A film roll container of the type having a receptacle portion having a bottom wall and a peripheral upstanding wall and a mating cover portion having a top wall and a peripheral depending wall overlapping the upstanding wall, the receptacle and cover portions having laterally extending central spindles for rotatably supporting opposite ends of a film roll when the cover portion is mounted on the receptacle portion, the film roll having an outer periphery, the combination comprising:

a plurality of spaced first protuberances projecting upwardly from the bottom wall in the space between one of the upstanding and dependent walls and the outer periphery of the film roll, each first protuberance having an end portion having a blind bore therein;

a plurality of spaced second protuberances depending downwardly from the top wall in the space between the other of the upstanding and dependent walls and the outer periphery of the film roll, each second protuberance being positioned in register with one of the first protuberances and having an end surface provided with a post, which post is insertable into a corresponding blind bore in the first protuberance for aligning and releasably holding the cover and receptacle portions together;

a plurality of spaced first bosses projecting upwardly from the bottom wall in the space between one of the upstanding and dependent walls and the outer periphery of the film roll, each first boss having an end portion having an annular recess therein on one side thereof and a V-shaped bore on the opposite side of the end portion;

a plurality of spaced second bosses depending downwardly from the top wall in the space between the other of the upstanding and dependent walls and the outer periphery of the film roll, each second boss being positioned in register with one of the first bosses and having an end surface having a cavity for defining an annular projection which is nestable in light-tight relation within the annular recess of the end portion of the first boss, each mating pair of the projections and end portions having centers through which registering openings extend; and means guided by the V-shaped bore through the openings for securing the first and second bosses and the receptacle and cover portions together in light-tight relation.

2. A film roll container according to claim 1 wherein the end portion of each end boss in cross section is substantially W-shaped, and the cavity in the end surface of each second boss is substantially V-shaped whereby the annular projection is of a substantially W-shaped cross section.

3. A film roll container according to claim 1 wherein the securing means comprises rivets.

* * * * *